United States Patent
Brown et al.

(10) Patent No.: US 6,665,108 B2
(45) Date of Patent: *Dec. 16, 2003

(54) SYSTEM FOR THE PRODUCTION OF A DYNAMIC IMAGE FOR DISPLAY

(75) Inventors: Carl V Brown, Oxford (GB); Maurice Stanley, Malvern (GB)

(73) Assignee: Holographic Imaging LLC, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/190,594

(22) Filed: Jul. 9, 2002

(65) Prior Publication Data

US 2003/0035190 A1 Feb. 20, 2003

Related U.S. Application Data

(63) Continuation of application No. 09/529,550, filed on Jun. 13, 2000, now Pat. No. 6,437,919.

(30) Foreign Application Priority Data

Oct. 15, 1997 (GB) ............................................. 9721866
Oct. 15, 1998 (WO) .............................. PCT/GB98/03097

(51) Int. Cl.[7] .................................................. G02F 1/01
(52) U.S. Cl. ....................... 359/277; 359/621; 359/272; 359/462
(58) Field of Search ................................ 359/621, 277, 359/272, 457, 456, 622, 623, 624, 462; 349/61, 95, 5, 7; 353/31, 33, 34, 37

(56) References Cited

U.S. PATENT DOCUMENTS

| 5,132,839 A | * | 7/1992 | Travis .......................... 359/462 |
| 5,534,704 A | * | 7/1996 | Robinson et al. ............ 250/550 |
| 5,666,226 A | * | 9/1997 | Ezra et al. ................... 359/621 |
| 5,703,717 A | * | 12/1997 | Ezra et al. ................... 359/462 |
| 6,016,224 A | * | 1/2000 | Namiki ........................ 359/619 |
| 6,437,919 B1 | * | 8/2002 | Brown et al. ................ 359/621 |
| 6,449,090 B1 | * | 9/2002 | Omar et al. .................. 359/465 |

FOREIGN PATENT DOCUMENTS

| EP | 0 494 666 A | 7/1992 |
| EP | 0 621 524 A | 10/1994 |
| GB | 2 206 763 A | 1/1989 |
| GB | 2 278 480 A | 11/1994 |

* cited by examiner

*Primary Examiner*—Hung Xuan Dang
*Assistant Examiner*—Tuyen Tra
(74) *Attorney, Agent, or Firm*—Nixon & Vanderhye P.C.

(57) ABSTRACT

A system for the production of a dynamic image for use in display applications includes a light source (16) which travels via a liquid crystal modulator (18) placed in the path of the light source (16). The output of the LC modulator (18) passes modulated light a lens ray (22) which itself guides light to an optically addressed spatial light modulator (24). The resulting real image from the optically addressed spatial light modulator (24) may be used in two dimensional and three dimensional displays. The addressing frame-rate of the liquid crystal modulator (18) is substantially greater than the frame-rate of the optically addressed spatial light modulator (24).

35 Claims, 3 Drawing Sheets

SYSTEM FOR THE PRODUCTION OF A DYNAMIC IMAGE FOR DISPLAY

This appln is a con't of Ser. No. 09/529,550 filed Jun. 13, 2000 U.S. Pat. No. 6,437,919.

BACKGROUND OF THE INVENTION

1. Field of the Invention

The present invention relates to a system for the production of a dynamic image for display and has particular, although not exclusive, relevance to such systems employing liquid crystal display devices for use in holography.

2. Discussion of Prior Art

It has long been known to use holographic techniques to produce a three-dimensional image of an object which has all of the depth cues used by the human brain in its image processing. Conventionally a real three-dimensional object is used in the production of the hologram by known techniques.

It is also known to use holographic stereogram techniques which, rather than rely on real three-dimensional object in the production of the hologram, rely upon multiple flat, two-dimensional, objects having different perspectives of a scene encoded as light intensity or phase differences across the surface thereof which can be used to produce a hologram therefrom.

Interferometrically derived, so-called display holography requires high performance materials such as silver halide to both record and replay the holograms. In order to achieve a very wide field of view, it is desirable to have resolutions down to around 10 nm. This resolution also allows for high fidelity and colour to be recorded and faithfully reproduced.

It has been recognised that it would be desirable to produce a dynamic, rather than static object possibly using this two-dimensional display holography technique. This will be possible by simple substitution of the holographic recording material by some form of electronically addressable spatial light modulator. These may consist of two-dimensional arrays of electronically addressable light modulation elements, referred to as pixels.

The above desirable result, however, meets with drawbacks because whilst conventional spatial light modulators are fabricated using a wide variety of techniques, they all suffer from an number of problems. None of the conventional spatial light modulators offer the potential to achieve small pixel sizes which are necessary to achieve the desired field of view. Additionally, none offer the number of pixels typically seen in a latent image hologram. The low resolution due to the low number of pixels results simply from the limits of technology at the present time. Even in leading systems, using a acousto-optic modulators and passive addressed ferroelectric liquid crystal modulators, the maximum number of pixels is limited by various reasons. The acousto-optic systems are limited due to the modulation bandwidth of the acousto-optic modulator which is typically a few-several hundred MHz. In liquid crystal systems this is due to the manufacturability of very complex displays. Currently 3000×2000 pixels has been achieved.

Accordingly, it would be desirable to be able to use an electronically addressable modulator to provide a dynamic image for display and possibly to be used for holography. The present invention therefore aims to at least alleviate the aforementioned shortcomings.

SUMMARY OF THE INVENTION

There is provided, in accordance with the present invention, a system for the production of a dynamic pattern for display comprising: a light source; first spatial light modulator means having an associated updating frame-rate in the path of the light source; relay optics means in the path of the light from the first spatial light modulator means for guiding the modulator light therefrom, and; second spatial light modulator means having an associated read-out frame-rate in the path of the guided light from the relay optics means and arranged to produce a real image therefrom for display, wherein the updating frame-rate of the first spatial light modulator means is greater than the read-out frame-rate of the second spatial light modulator means.

This enables the image produced at the second spatial light modulator means, which operates at a far slower address rate than the first spatial light modulator means, to be effectively governed by the operation of the first spatial light modulator means. This permits a trade off between the temporal information available in high frame-rate spatial light modulators and thereby obtain a high complexity system working at a lower frame rate. It will be apparent to those skilled in the art that the term complexity as used herein refers to the number of pixels forming the grid of the spatial light modulator.

Preferably the second spatial light modulator means comprises an optically addressable spatial light modulator. Use of an optically addressed spatial light modulator enables the active screen formed by the grid of pixels therein to be divided into segments.

Additionally or alternatively the first spatial light modulator means maybe arranged to produce a plurality of modulated light sources from the light source to the relay optics means. In this way the first spatial light modulator may be used to provide a plurality of images for subsequent use within the system.

Additionally or alternatively the first spatial light modulator means may comprise a plurality of spatial light modulators. This allows an alternative way of producing a plurality of images.

The first spatial light modulator means may be electrically addressable. This enables a fast rate of dynamic image to be produced.

Preferably the relay optics means guides modulated light from the first spatial light modulator means to the second spatial light modulator means in a predetermined pattern. Alternatively the relay optics means may modulate the phase or polarisation of light guided thereby. This permits for predetermined guiding/modulation of light by the relay optics means. The relay optics means may comprise a lens means or an array of individual lenses or a beam splitter or a shadow mask, or holographic optical element. Alternatively the relay optics means may comprise a diffractive array generator such as a diffractive array element or holographic array element.

The complexity of the first spatial light modulator means may be less than the complexity of the second spatial light modulator means. This allows, for example, for repeat patterns to be formed on the second spatial light modulator means. In a preferred embodiment, the modulated light from the first spatial light modulator means may be replicated at the second spatial light modulator means by the relay optics means. Additionally the replication of the modulated light may comprise a plurality of patterns. Usefully the relay optics means guides the replicated modulated light time-sequentially to predetermined portions of the second spatial light modulator. In this way the relay optics means may reproduce a pattern at the second spatial light modulator of that provided by the first spatial light modulator.

Preferably the second spatial light modulator means comprises a ferroelectric liquid crystal light modulator. Additionally the light source may be an incoherent light source. The light source may usefully be a point light source. In certain circumstances, though, the light source may be a plurality of individual light sources, even colour or colour sequential light sources. The liquid crystal light modulator is also capable of itself acting as the light source.

According to a second aspect of the present invention there is provided a method of producing a dynamic image for use in display comprising:

providing a light source and passing this light source through a first spatial light modulator means having an associated addressing frame-rate; guiding the modulated light via a relay optics means, disposed in the path of the modulated light, to a second spatial light modulator means, which second spatial light modulator means has an associated addressing frame-rate less than the associated addressing frame-rate of the updating frame-rate of the first spatial light modulator; and providing a real image or pattern from the second spatial light modulator means.

BRIEF DESCRIPTION OF THE DRAWINGS

The present invention will now be described, by way of example only, and with reference to the accompanying drawings of which.

DETAILED DISCUSSION OF PREFERRED EMBODIMENTS

Figure 1:
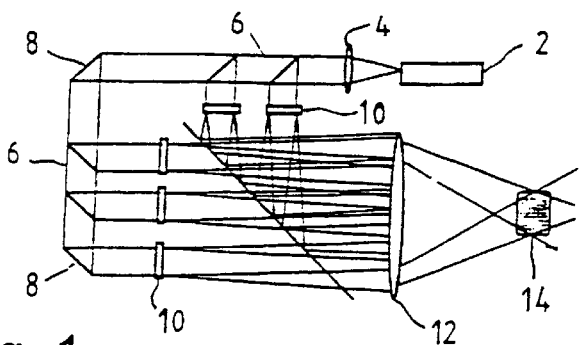
FIG. 1 illustrates a known device for the optical recombination of data from a plurality of spatial light modulators.

By referring first to FIG. 1 a known device for the optical recombination of light from many spatial light modulators is shown. A laser light source 2 provides a collimated beam via lens 4 through a plurality of beam splitters 6 and mirrors 8 to spatial light modulators 10 which then allow the light to pass through a final focusing lens 12 to provide a holographic image 14 in a known manner. In order for such a system to be able to replay high complexity high resolution generated holographic images, the light from the spatial light modulators (herein referred to as SLM) 10 needs to be optically recombined. Those skilled in the art will appreciate that the term "complexity" as used herein refers to the number of pixels in the SLM grid. The example shown in FIG. 1 utilises the inherent parallel nature of optical systems. Furthermore the complexity available for the generated holographic image increases in proportion to the number of SLMs used.

Figure 2:
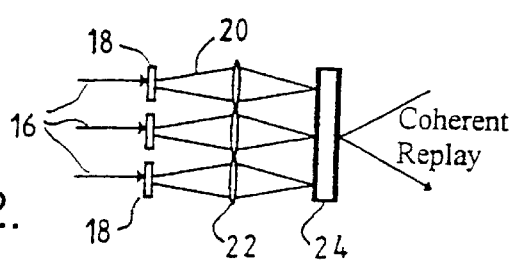
FIG. 2 illustrates schematically a first embodiment of the present invention.

Referring now to FIG. 2 it can be seen that by utilising a light source, here an incoherent light source 16 to provide light to be modulated by a series of first spatial light modulator means, in this example electrically addressed liquid crystal (LC) modulators 18, a simpler and less space-consuming arrangement may be employed. The modulated light 20 passing from the liquid crystal modulators 18 next travels via a relay optics means, in this example an array of lenses 22. It can be seen that the array of lenses 22 are convex lenses and serve to focus the modulated light 20 onto a second spatial light modulator means, which in this example is an optically addressed SLM 24. At the right hand side of FIG. 2 on the right hand surface of the optically addressed SLM 24, is formed a pattern which can be used to provide a holographic image in known manner. In the figure this is labelled as "coherent replay" and those skilled in the art will appreciate that this refers to the coherent laser light impinging upon the real image surface of the optically addressed SLM 24 to produce the holographic image in conventional matter.

The use of demagnifying optics in this example is employed to decrease the effective pitch of each pixel in the SLMs and since the data is projected from several sources i.e. the LC modulators 18, in parallel onto the optically addressed SLM 24 then there is no extra frame-rate requirement on the modulators 18, 24 themselves. In this manner therefore the LC modulators 18 which operate at an addressing frame rate substantially above the addressing frame-rate of the optically addressed SLM 24 may provide a real image on the optically addressed SLM 24 suitable for holography purposes. In this example the LC modulator 18 comprises an active back plane liquid crystal on a silicon device, which has a complexity of 320×240 pixels with a frame-rate in excess of 1 kHz. The optically addressed SLM 24 is an amphorous silicon photosensitive layer which modulates voltages across a reflective liquid crystal layer and, in this example, has an addressing frame-rate of 50 Hz.

In this example the light source is provided by a computer generated two dimensional phase or amplitude pattern, or it could indeed be an electrically addressed SLM itself. Indeed it would even be possible for the light source to be the LC modulator 18.

Figure 3:
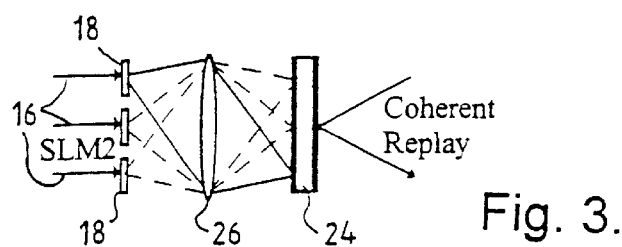
FIG. 3 illustrates schematically a second embodiment of the present invention.

Referring now in addition to FIG. 3 it can be seen that the incoherent light source 16 and LC modulators 18 remain but the lens array 22 has been replaced by another relay optics means, have a single focusing lens 26. Once again, in common with the example of FIG. 2, the advantage of such a system is that incoherent light is used in the replication of the images from the LC modulator 18 onto the optically addressed SLM 24. This means that the requirements of the optical flatness tolerances of SLMs common in the art, the accuracy to which the SLMs must be oriented on a flat plane and the tolerances on the positions of all the optical components in the projection part of the system, are very much lower than would be the case with the example system of FIG. 1.

Figure 4:
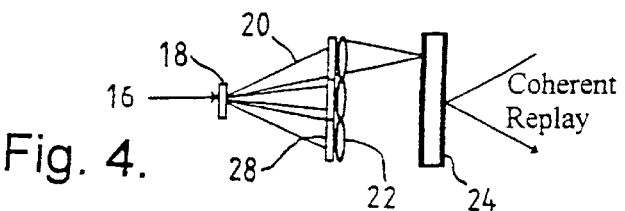
FIG. 4 illustrates schematically a third embodiment of the present invention.
Figure 5:
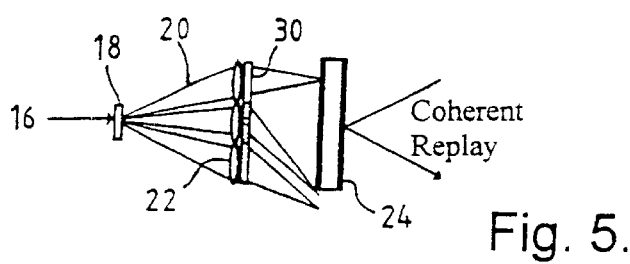
FIG. 5 illustrates schematically a fourth embodiment of the present invention.
Figure 6:
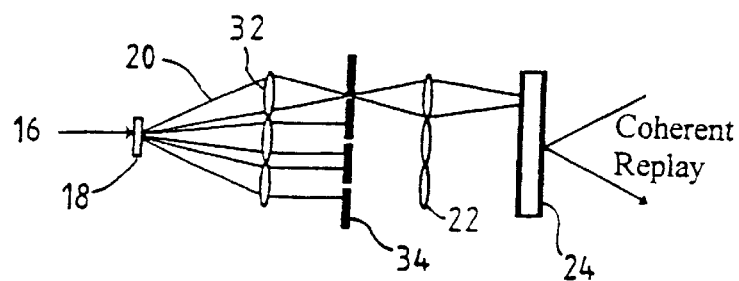
FIG. 6 illustrates schematically a fifth embodiment of the present invention.

Referring now to FIGS. 4, 5 and 6, it can be seen that examples are given employing a single LC modulator 18 but with alternative forms of relay optics means. In the example of FIG. 4 the relay optics means comprises a shutter array 28 in the path of the modulated light 20 before reaching the lenses array 22. In these examples the optically addressed SLM 24 is of the ferroelectric type and this allows a high speed application. This is exploited in these example by projecting data from the incoherent light source 16 via the LC modulators 18 and the shutter array 28 and lens array 22 to different parts of the optically addressed SLM 24 in consecutive time frames. The full pattern of the data is thus split up into frames with a number of pixels equal to the complexity of the optically addressed SLM 24. It will be appreciated by those skilled in the art that if the LC modulators 18 have "n" pixels, and the full pattern to be displayed has "m" pixels, then the number of frames of "n" pixels to make up a pattern of "m" pixels is $$\left(\frac{m}{n}\right).$$

These frames are displayed time-sequentially on the optically addressed SLM 24 with each frame being projected to a different part of the optically addressed SLM 24 and stored to build up the full image pattern over time. This technique is known to those skilled in the art and is not too dissimilar for example to the Raster scans as used in conventional television display screens. The use of the shutter array 28 is controlled by circuitry to allow the above to take place in known manner. Indeed the lenses of the lens array 22 will each image the modulated light 20 impinging thereon onto a different part of the optically addressed SLM 24. When the pattern is chanced via the LC modulator 18 the position of the open shutter of the shutter array 28 is also changed. By cycling through a sequence of different patterns on the LC modulator 18 which are themselves synchronised in time with the opening of different shutter positions in the array 28, a large pattern is built up on the optically addressed SLM 24. The shutters could equally well be replaced by suitable phase plates or switchable polarising plates. If the incoherent light source 16 was arranged to be with linear polarised light and there was an appropriately oriented polarising plate between the lens array 22 and the optically addressed SLM 24, then light would be blocked for an element in the phase plate array which was switched to act as a half wave plate. A switchable polariser array could also be used in a similar arrangement, without the need for a second polariser.

In the examples shown in FIG. 5 the shutter array 28 of FIG. 4 can be replaced by an array of switchable beam steerers 30. The beam steerer in the examples shown is a switchable diffraction grating of common construction, for example a nematic liquid crystal cell with grating defined in photoresist or in surface relief and which are indexed matched with a liquid crystal in the unswitched orientation but not when it is switched by an electric field. Those skilled in the art will be familiar with this technology so it will not be described any further herein. Alternatively the beam steerers 30 may be of the type including a lenslet array combined and replaced with a switchable or reconfigurable fresnel lenslet array.

FIG. 6 uses a switchable lens array 32 to provide a selective focus for the modulated light 20 to pass via a pin hole array 34. In this example light from a switched lens of the array 32 may propagate through the pin hole 34 at its focus and is then re-imaged onto the optically addressed SLM 24 via the lens array 22. For the case of an unswitched lens in the array 32 which allows the modulated light 20 incident therethrough unfocussed, only a small fraction of light will be transmitted through the pin hole array 34. An array of lenses 32 which only acts on one polarisation of light combined with a linear polariser is also possible here.

Figure 7:
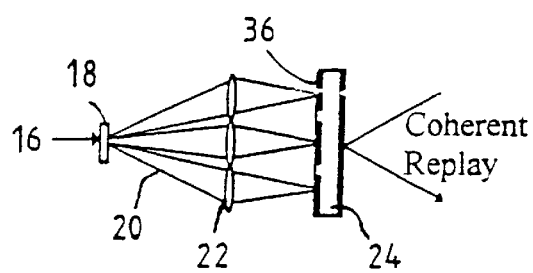
FIG. 7 illustrates schematically a sixth embodiment of the present invention.

Referring now to FIG. 7 it can be seen that, in this embodiment, the optically addressed SLM 24 includes an optical front surface for receiving the light from the lens array 22 via a series of pixellated electrodes 36. In this example the light modulating layer in the optically addressed SLM 24 is arranged to be bi-stable such as ferroelectric liquid crystal display, so that when a voltage is applied across a particular region of the optically addressed SLM 24 a pattern is written into this layer which remains when the voltage is removed. As patterns are displayed time-sequentially on the LC modulator 18, then voltages are applied to active different areas of the optically addressed SLM 24 in synchronisation with this.

Figure 8:
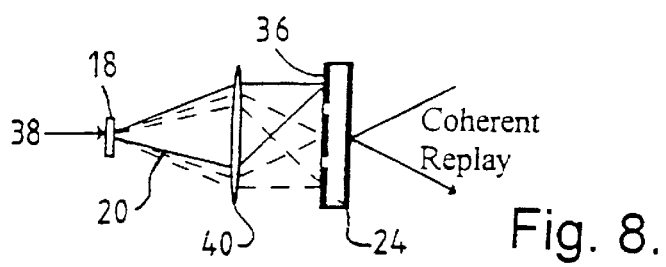
FIG. 8 illustrates schematically a seventh embodiment of the present invention.

Referring now to the example shown in FIG. 8, the light source here is a coherent light source 38. This example does not require any switchable optical components. The patterns which are displayed time-sequentially on the LC modulater 18 from the coherent light source 38 could themselves be holograms, for example. These are calculated to give the required pattern when projected onto the optically addressed SLM 24. In principle, the optically addressed SLM 24 does not need to have pixellated electrodes 36, however, in practice this may be required to enable the removal of dc components and unwanted diffraction spots.

Figure 9:
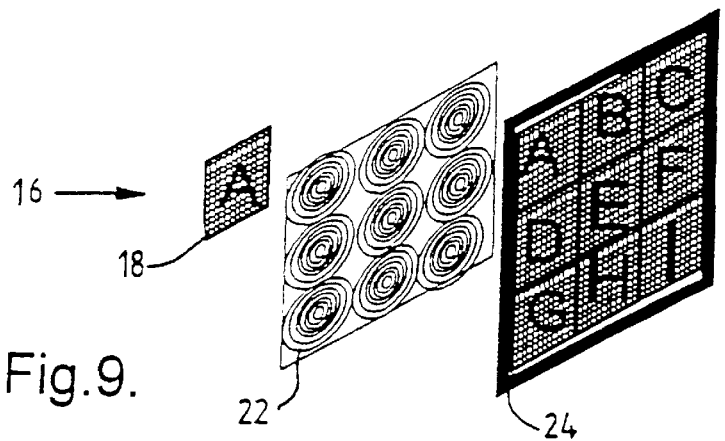
FIG. 9 shows a perspective view illustrative of an eighth embodiment of the present invention.

FIG. 9 shows an example of the system of FIG. 7 but in perspective and not in schematic view. Here it can be seen that it can be light source 16 first travels via the LC modulator 18 and then via the lens array 22 (the shutter array 28 is hidden from view) and finally on to the optically addressed SLM 24. Once again, and in common with all embodiments herein, the image on the LC modulator 18 can be updated at a relatively rapid rate. The relay optics, here the lens array 22 and shutter array 28 replicate the image formed on the LC modulator 18 onto the input photosensitive face of the optically addressed SLM 24 in an array whose size is determined by the relay optics system. This is because each lens in the array 22 forms a unique image of the LC modulator 18 onto the optically addressed SLM 24. Image magnification can also occur in the relay optics system.

In these examples, because the optically addressed SLM 24 is a bi-stable (such as ferroelectric liquid crystal). Then each segment labelled A to I of FIG. 9 in the optically addressed SLM 24 sequentially loads the image by applying a voltage to an electrode covering that segment. One or more segments may be loaded in one system clock period. Segments which do not have any voltage applied thereto at that time do not update the image for readout. When the LC modulator 18 updates is image, this can also then be selectively loaded onto the optically addressed SLM 24. In this manner a complex image is built up. When the image has been completed on the optically addressed SLM 24, this can be read out by coherent replay as shown in the figures. It will be appreciated by those skilled in the art that because the addressing frame-rate of the LC modulator 18 is significantly greater than that of the optically addressed SLM 24, then the high frame rate, medium complexity information available on the LC modulator 18 is effectively transferred to the high complexity, medium frame rate of the optically addressed SLM 24.

Figure 10:
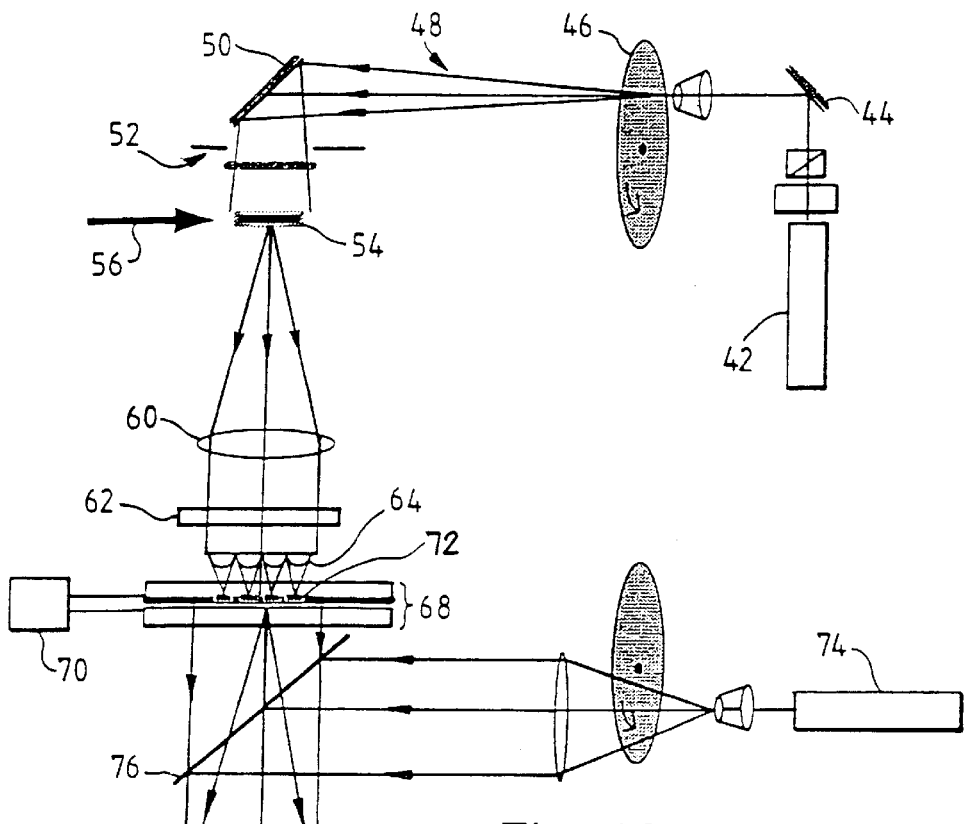
FIG. 10 illustrates schematically a preferred working embodiment of the present invention.

Referring now to FIG. 10, there is illustrated a preferred working embodiment of the present invention. An Argon laser 42 provides the light source and the light therefrom is reflected from a mirror 44 via a spinning diffuser 46. The purpose of the diffuser 46 is to diverge the beam of light from the laser 42 so that it no longer has the characteristics of a point-source. The diverging light 48 from the diffuser 46 is reflected by a further mirror 50 and then via an aperture diffuser 52 so as to impinge upon the first spatial light modulator, here a computer-controlled liquid crystal matrix 54. The addressing controls for the matrix 54 are not shown, as they will be readily apparent to persons skilled in the art. The addressing line, however, is shown as 56.

The light which has passed through and been modulated by the matrix 54 then passes through a convex lens 60 and is collimated thereby. From here, it passes via a shutter 62 and on to the relay optics means, in this example, a lenslet array 64. In this example, the lenslet array 64 is arranged as a two-dimensional grid so that each lenslet of the array correlates with a segment of the second spatial light modulator to which light is passed therefrom. In this example, the second spatial light modulator means is an optically-addressed spatial light modulator 68 which operates under the control of a pulse generator 70 in known manner.

At 72 the demagnified and replicated image from the matrix 54 is reproduced. As in the previous examples, because the addressing frame-rate of the matrix 54 is 1 kHz and that of the modulator 68 is 50 Hz, then a twenty times difference in addressing rates is achieved. It is believed that the present invention has utility with differences between four times to up to one thousand times, and even beyond this.

The optical output of the modulator 68 is then used in conventional manner to provide a holographic display by use of a Helium-Neon laser 74 and beamsplitter 76 to provide a holographic image of the object (i.e. the matrix 54). The image may be viewed by a camera 78.

It will be understood that, in all the above examples, optical imaging other than holography is possible. Any source of either coherent or incoherent light will suffice. Also, colour light sources—even colour sequential light sources—may be employed. Furthermore, the relay optics means may itself comprise a diffractive array generator such as a diffractive array element or a holographic array element. In fact the relay optics means could even be non-optical. For example, an electron beam transfer system could be used. Of course the input to and output from the relay optics means would itself be optical.

Figure 11:
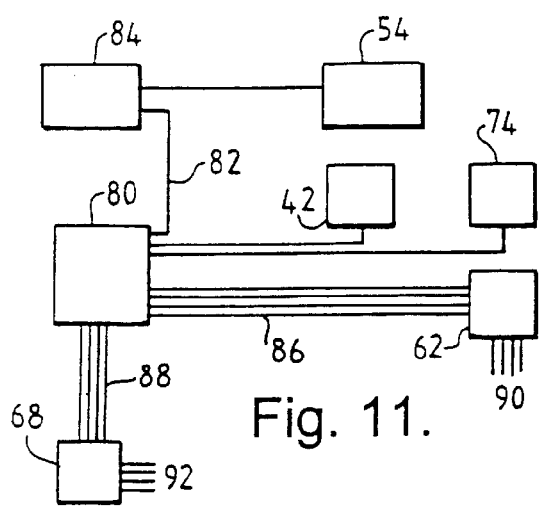
FIG. 11 illustrates a functional representation of the salient parts of the preferred embodiment of FIG. 10.

FIG. 11 shows the functional representation of the embodiment of FIG. 10. A control PC, or other computer, having a digital input/output interface 80 acts to control operation of the entire system. An image synchronising signal 82 is sent to an interface 84 having a data frame store. The interface 84 communicates with the PC 80 so as to send operating signals to the matrix 54.

The control PC 80 also controls operation of the Argon laser 42 (used to produce the object) and the Helium-Neon laser 74 (used to produce the holographic image). It can also be seen that the control PC 80 operates via respective parallel communication buses 86 and 88 to control operation of the shutter 62 and optically address spatial light modulator 68 respectively. Each of the shutter drive modules 62 and optically addressed spatial light modulator driver modules 68 have their own parallel data outputs 90, 92 respectively, so that the selected segments of the shutter array and optically addressed spatial light modulator, respectively, can be addressed.

It will be apparent to those skilled in the art that whilst in the above the relay optics means has been said to guide the light, it could equally well modulate the phase of light incident thereon. Additionally it will be apparent that whilst in some of the above examples a beam splitter has been used, equally a beam steerer may be employed.

What is claimed is:

1. A system for the production of a pattern in display comprising:
   a light source;
   first spatial light modulator having an associated updating frame-rate in the path of the light source;
   relay optics in the path of the light from the first spatial light modulator for guiding the modulated light therefrom;
   a second spatial light modulator having an associated read-out frame-rate in the path of the guided light from the relay optics and arranged to produce a real pattern therefrom for display, wherein the updating frame-rate of the first spatial light modulator is greater than the read-out frame-rate of the second spatial light modulator.

2. A system according to claim 1 wherein the second spatial light modulator comprises an optically addressable spatial light modulator.

3. A system according to claim 1 wherein the first spatial light modulator is arranged to produce a plurality of modulated light beams from the light source to the relay optics.

4. A system according to claim 1 wherein the first spatial light modulator comprises a plurality of spatial light modulators.

5. A system according to claim 1 wherein the first spatial light modulator is electrically addressable.

6. A system according to claim 1 wherein the relay optics guides modulated light from the first spatial light modulator to the second spatial light modulator in a predetermined pattern.

7. A system according to claim 1 wherein the relay optics modulates the phase of light guided thereby.

8. A system according to claim 1 wherein the relay optics comprises at least one lens.

9. A system according to claim 8 wherein the at least one lens comprises an array of individual lenses.

10. A system according to claim 1 wherein the relay optics comprises a beamsplitter or beam steerer.

11. A system according to claim 1 wherein the relay optics includes a shadow-mask.

12. A system according to claim 1 wherein the modulated light from the first spatial light modulator is replicated at the second spatial light modulator by the relay optics means.

13. A system according to claim 12 wherein the replication of the modulated light comprises a plurality of images.

14. A system according to claim 12 wherein the relay optics guides the replicated modulated light time-sequentially to predetermined portions of the second spatial light modulator.

15. A system according to claim 1 wherein the second SLM has at least one electrode divided into a plurality of separately addressable sub-regions.

16. A system according to claim 15 wherein each of the separately addressable sub-regions correspond to a region of modulated light from the relay optics.

17. A system as claimed in claim 16 wherein one or more of the electrode sub-regions on the second spatial light modulator is arranged to be activated in synchronization with the modulated light from the first spatial light modulator.

18. A system according to claim 1 wherein the number of pixels capable of being displayed on the first spatial light modulator is less than the number of pixels capable of being displayed on the second spatial light modulator.

19. A system according to claim 1 wherein the second spatial light modulator is a ferroelectric liquid crystal light modulator.

20. A system according to claim 1 wherein the light source is an incoherent light source or a plurality of light sources.

21. A system according to claim 1 wherein the second spatial light modulator is illuminated with at least one read-out light source.

22. A system according to claim 21 wherein the read-out light source comprises color sources arranged to illuminate the spatial light modulator.

23. A system according to claim 21 wherein a plurality of read-out light sources comprising color sequential light sources are arranged to illuminate the spatial light modulator.

24. A system according to claim 1 wherein the system is arranged to produce holographic images.

25. A system according to claim 1 wherein the system is arranged to produce two dimensional images.

26. A system according to claim 1 wherein the system is arranged to produce images suitable for a stereogram display.

27. A method of producing a pattern for use in display comprising:

providing a light source and modulating this light source using a first spatial light modulator having an associated updating frame-rate; the method characterised by guiding the modulated light via relay optics, disposed in the path of the modulated light to a second spatial light modulator and producing a real pattern therefrom for display, which second spatial light modulator has an associated read-out frame-rate less than the associated updating frame rate of the first spatial light modulator; and providing a real pattern from the second spatial light modulator.

28. A method as claimed in claim 27 wherein the second spatial light modulator comprises an optically addressable spatial light modulator.

29. A method as claimed in claim 27 wherein the first spatial light modulator is arranged to produce a plurality of modulated light sources from the light source to the relay optics.

30. A method as claimed in claim 27 wherein the first spatial light modulator is electrically addressable.

31. A method as claimed in claim 27 wherein the relay optics guides modulated light from the first spatial light modulator to the second spatial light modulator in a predetermined pattern.

32. A method as claimed in claim 27 wherein the relay optics comprises at least one lens.

33. A method as claimed in claim 27 wherein the relay optics guides the modulated light time-sequentially from the first spatial light modulator to predetermined portions of the second spatial light modulator.

34. A method as claimed in claim 27 wherein the number of pixels capable of being displayed on the first spatial light modulator is less than the number of pixels capable of being displayed on the second spatial light modulator.

35. A method as claimed in claim 27 wherein the relay optics produces multiple replications of the pattern shown on the first spatial light modulator onto the second spatial light modulator and where the second spatial light modulator has at least one electrode divided into a plurality of sub-regions such that the sub-regions of the second spatial light modulator are separately addressable.

* * * * *